United States Patent
Musico

(10) Patent No.: US 7,093,727 B2
(45) Date of Patent: Aug. 22, 2006

(54) PLURAL UTENSILS SUPPORT SYSTEM

(76) Inventor: M. James Musico, 15 Church St., Tremont, PA (US) 17981

( * ) Notice: Subject to any disclaimer, the term of this patent is extended or adjusted under 35 U.S.C. 154(b) by 154 days.

(21) Appl. No.: 10/939,401

(22) Filed: Sep. 14, 2004

(65) Prior Publication Data
US 2006/0054578 A1    Mar. 16, 2006

(51) Int. Cl.
*F16M 13/00* (2006.01)
*A47H 1/10* (2006.01)

(52) U.S. Cl. ............... 211/105.1; 211/105.3; 211/123; 211/206; 248/67.7; 248/174; 248/200.1; 248/201; 248/220.21; 248/220.22; 248/251; 108/29

(58) Field of Classification Search ............ 211/105.1, 211/105.3, 123, 206; 248/174, 251, 261, 248/200.1, 201, 62, 67.7, 220.22, 300
See application file for complete search history.

(56) References Cited

U.S. PATENT DOCUMENTS

| | | | | |
|---|---|---|---|---|
| 1,799,319 A | * | 4/1931 | Reynolds | 211/123 |
| 2,825,469 A | * | 3/1958 | Watkins et al. | 211/105.3 |
| 2,908,471 A | * | 10/1959 | Hollansworth | 248/247 |
| 4,783,030 A | | 11/1988 | Buerhop | 288/744 |
| 5,111,770 A | | 5/1992 | Weelink | 119/27 |
| 5,328,037 A | * | 7/1994 | Fujii | 211/55 |
| 5,582,303 A | * | 12/1996 | Sloan | 211/105.1 |
| 5,647,490 A | * | 7/1997 | Hull et al. | 211/90.01 |
| 5,813,641 A | | 9/1998 | Baldwin | 248/223.41 |
| 5,887,831 A | | 3/1999 | Post | 248/49 |
| 5,961,248 A | | 10/1999 | Tourtelle | 403/400 |
| 6,098,942 A | | 8/2000 | Heath | 248/228.6 |
| 6,505,796 B1 | * | 1/2003 | Roth | 248/62 |

* cited by examiner

*Primary Examiner*—Richard E. Chilcot, Jr.
*Assistant Examiner*—Jared W. Newton
(74) *Attorney, Agent, or Firm*—A. R. Eglington

(57) ABSTRACT

A utensil support assembly as mounted on a building sidewall with one offset bar adapted to support a plurality of utensils. The horizontally aligned, utensil support bar is anchored close to each longitudinal end by a bracketing set also adapted to be wall mounted at its flanged longitudinal ends. The flattened apexes of each bracket element are flanged and sized to provide a passageway for the bar shaft while they are nested.

8 Claims, 2 Drawing Sheets

PLURAL UTENSILS SUPPORT SYSTEM

CROSS REFERENCE TO OTHER APPLICATIONS

This is a non-provisional patent application submitted for an official filing receipt under Code §111(b). It is a continuation-in-part of my provisional Specification, same title, and accorded U.S. Ser. No. 60/273,566, filed Mar. 7, 2001.

BACKGROUND OF THE INVENTION

In active workplaces, like the kitchens of commercial restaurants, the turnover of many utensils is cyclical. As quickly as pans and pots are used, sanitized, and exposed to fast ambient air drying. They are relocated for quick re-use, which site must be seeable and reachable. Open wall space in a commercial kitchen is often wasted space, unless it can be adapted to employ the hangable utensil means of the present invention.

OBJECT OF THE INVENTION

It is a principal object of the invention to provide a sidewall mountable kit of precut members that upon ready assembly, will provide an off-the-floor, and out-of-the-way means for temporary storage of working tools (bulky utensils), that are intermittently used in the work place, such as in a commercial kitchen.

It is another object of the invention to provide a utensil support kit that is readily mounted on the sidewalls of a work area (usually anchored on the hidden studs inside dry walls of the work area) in almost any usable sidewall space, in a bar which can be shifted vertically, or laterally, or can be cut to fit to utilize such storage space.

It is still a further object of the invention to provide a utensil support means of a variable linear length, and with load-bearing features, that assembly kit for which comprises merely five major components, and which can be removed and repositioned at will.

SUMMARY OF THE INVENTION

According to the invention, there is provided a hangable, multi-tool support assembly, normally offset from the supporting sidewall, which assembly is comprised of substantially identical, end bracketing sets, these being operatively linked to a rigid linear bar, which bar is interruptably clamped at each of its longitudinal ends by one of the bracketing sets, with the bar being held in a transverse slot defined by the mated clamping components of each bracketing set. The mated components can be fabricated to have a somewhat varied central dimension, so as to provide bar support slots of variable cross sections, which are then adaptable to the cross sectional configuration of the intended rigid bar itself. Each bracketing set consists of two clamps, one is a generally V-shaped rigid member having outwardly flanged longitudinal ends (functioning as feet), a substantially planar central segment with sloped linear segments laterally connecting the respective flanged end to the central segment, and thus providing for a substantial lateral offset between the common plane of the two flanged feet and the plane of the central segment.

The first and innermost of the V-shaped clamping members has a first and slightly longer linear length on its outward surface, while the second outer V-shaped clamping member has a second and slightly shorter linear length for its inner surface, relative to the first length. The somewhat disparate first and second linear length of the inner and outer surfaces of the opposing members are chosen, so that upon their saddle mating, that they provide a generally rectangular space (slot) between the opposing planar segments of the mated members. This three dimensional slot is adapted to receive and to clampingly engage a horizontal rigid bar proximal to one of its longitudinal ends. In order for the mated bracket components themselves to be sidewall mounted, while concurrently clamping upon the supported bar, at least one aperture is provided in each of the flanged feet, which aperture is adapted to receive a fastener, like an elongate wood screw. Such fastener pairs serve to affix the mated bracketing set to the supporting wall, and upon their maximal tightening to secure the bar ends in a clamping engagement, until the fastener is at least partially withdrawn from the stud penetration position.

In a preferred embodiment, there is provided a hang bar assembly for interruptible suspension of one or more utensils, having a hang bar which is offset from, while mounted securely on a building sidewall comprising:

(a) a horizontally aligned, elongate rigid bar of a variable length which bar is offset laterally from the building sidewall when in use;

(b) at least two pairs of bracketing sets, each set being disposed proximal to one of the opposing longitudinal ends of the rigid bar;

(c) means provided in the longitudinal ends of each element of the bracketing set to secure them to the adjacent sidewall while concurrently supporting the rigid bar in a functional position; and (d) with each such set further comprising a first and second bracketing elements in each of the bracketing sets further comprising the first bracketing element having a generally V-shaped configuration with a planar apex when viewed in vertical cross section, and being of a first horizontal central depth; the second bracket element also having a substantially identical, V-shaped configuration, also with a planar apex when viewed in cross section, and being of a second horizontal central depth, which second depth is greater than that of the first depth of the first bracketing element, such that when the first element is conjoined with the second element, that they present a passageway between their planar apexes, which is sized to receive the shaft of the rigid bar, and to support same firmly one longitudinal end of said bar; and, the second bracketing set is identically configured and sized to the first bracketing set, and located to receive and support the opposing longitudinal ends of the rigid bar, thereby presenting a utensil support means in an area of frequent usage.

In an alternate embodiment, should an extra long rigid bar for hanging utensils be called for in a work place, a third bracketing set, like the other two, can be installed at a location intermediate of the outer end sets, and thus serve to slidingly receive and support the rigid bar somewhere along its intermediate section.

DESCRIPTION OF A PREFERRED EMBODIMENT OF THE INVENTION

Figure 1:
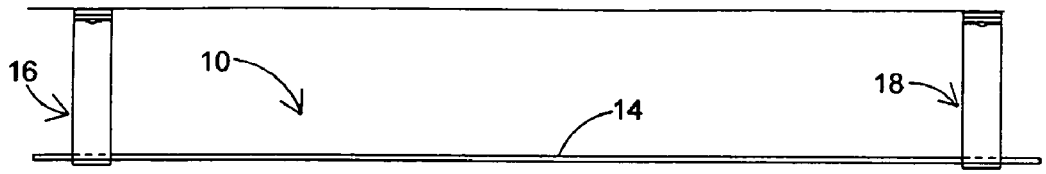
FIG. 1 is a top plan view of an elongate rigid bar anchored by the lateral support assemblies of the present invention each of which are positioned proximal to the bar longitudinal ends.

In the top elevational view of FIG. 1, the rigid bar support assembly of the present invention is generally 10. Comprised of a vertical, sidewall 12, a horizontal rigid bar 14, and two substantially identical, bracketing sets 16 and 18, respectively. Note that bar 14 is significantly offset laterally from the sidewall 12 by virtue of the bowed structure of set 16/18, and configured so as to aid hanging of three dimensional utensils (not shown) anywhere along the hanging bar itself.

Figure 2:
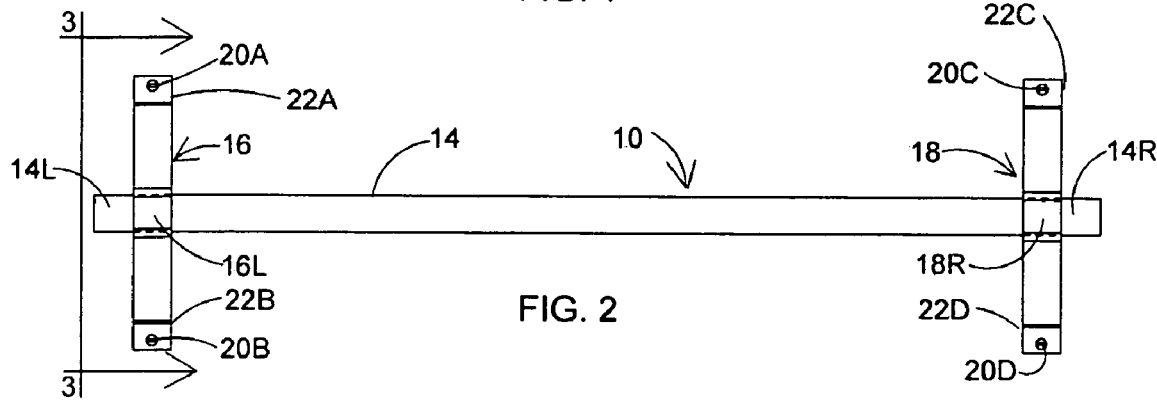
FIG. 2 is a front elevational view of the bar support assembly of FIG. 1, depicting the elongate bar as being supported near each of its longitudinal ends by a like set of clamping and bracketing set assemblies.

In the front elevational view of FIG. 2, the manner of mounting and clamping rigid bar 14 is also depicted, with the longitudinal end of bar 14 being firmly retained within central segments 16L and 16R of the bracketing sets, 16/18. Note that a number of perforations 20A/B/C/D, are provided in the flanged segments 22A/B/C/D of each bracket sets. These perforations as depicted, have received fasteners, 24A/B/C/D (FIG. 4), which then affixes the entire assembly to sidewall 12. Note that the elongate dimension of bar 14 is variable, and so it can be sized to the particular wall mounting space of the workplace. For any moderate length, just the depicted two brackets are mounted proximal at the longitudinal ends. However, for an extreme length, a third bracketing assembly (FIG. 4) may be employed and is located intermediate of the longitudinal ends of the depicted elongate bar 14.

Figure 3:
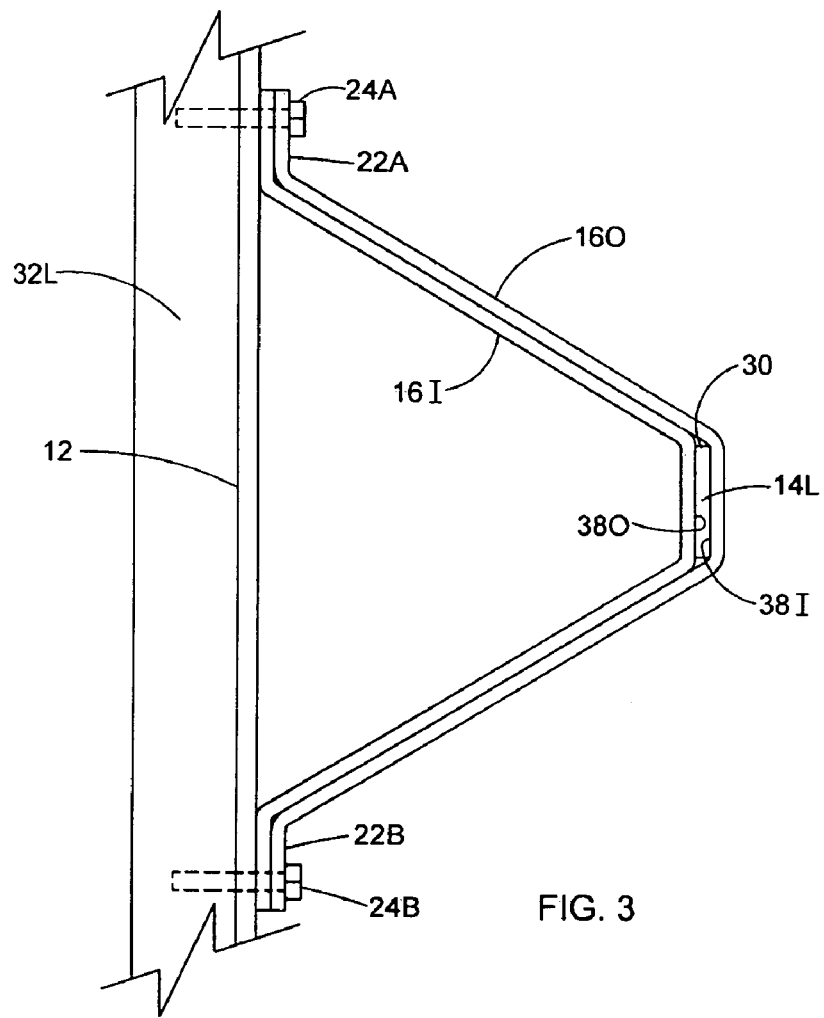
FIG. 3 is an end elevational view, taken along lines 3—3 of FIG. 2, depicting one longitudinal end of the bar support bracket assembly, while it is affixed to the supporting sidewall, with an elongate bar cross section seen clamped in situ.

In the side elevational view of FIG. 3, the left hand, bracketing set 16 is shown in its operable mode. It comprises supporting sidewall 12, the mated but slightly offset, inner and outer bracket members 16I and 16 0, upper and lower fasteners 24A/B, the gap-like slot 30, in which is positioned the left hand, longitudinal end 14L of elongate bar 12. The bar receiving slot 30 is configured so that upon the maximal tightening into the sidewall of the two fasteners, that the bar itself is fairly fixed in its chosen lateral position, which position can be varied, as will be described.

Figure 4:
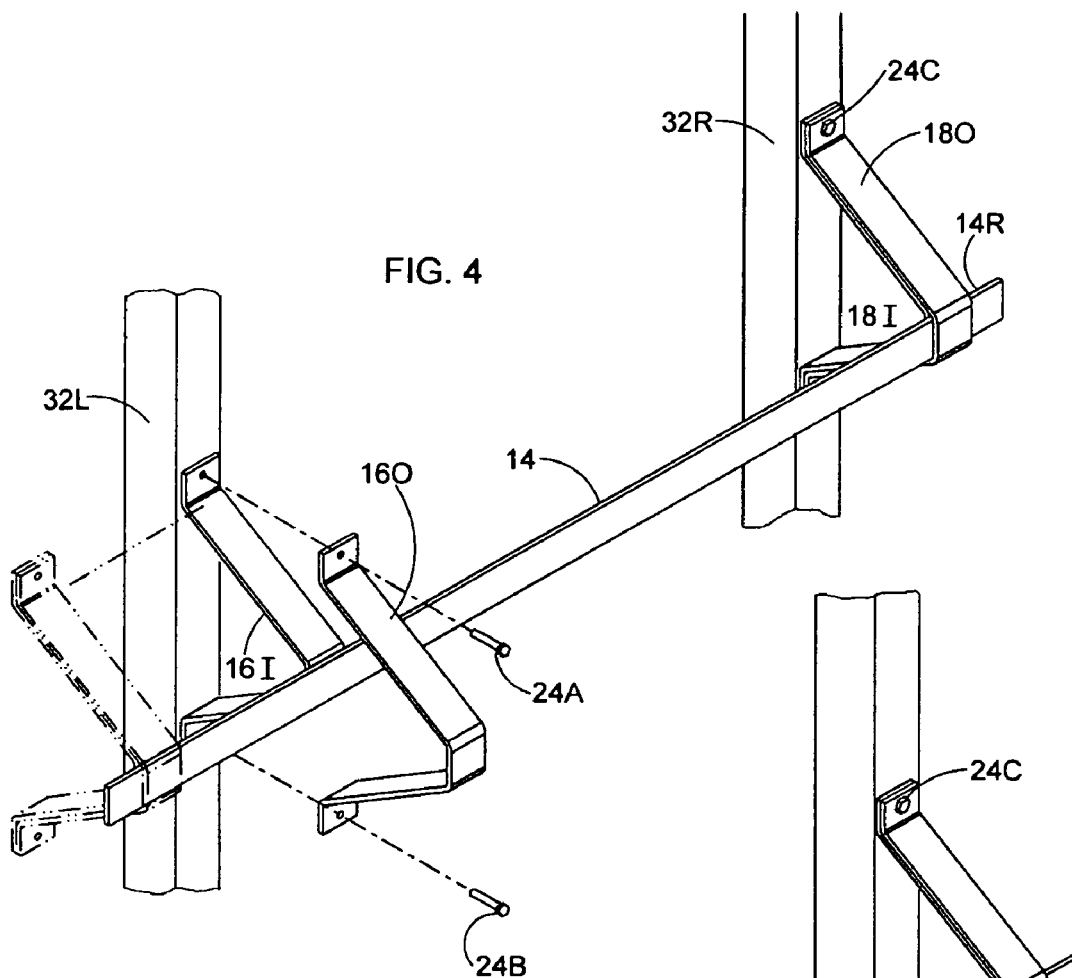
FIG. 4 is a perspective view of the bar support assembly of FIG. 2, now depicting securing of one of the mounted and fixed bracketing subassembly at the one longitudinal end, and the in progress clamping of the elongate bar at its other longitudinal end to the supporting assembly.

Looking to the perspective view of FIG. 4, one of the assembly steps for the bar support means is depicted. Right hand longitudinal end 14R of bar 14 is positioned and anchored by the right hand anchoring set 18 on vertical stud 32R (sidewall 12 is removed for clarity of view). Inner bracketing component 16I has been located vertically upon vertical stud 32L. With left hand end 14L of bar 12 properly aligned overlapping the outer segment 38 0 of inner member 16I, the outer member 16 0 will be mated with underlying inner member 16I; then, to set the intermediate segment, use the fasteners (not seen), serving to anchor the depicted bar section 14L to the bracket 16.

Shown in phantom in FIG. 4, is a third bracketing set, generally 34, which is located apart from at the left hand, proximal end of bar 12; this bracketing set 34 itself will be mounted upon another vertical post (or wall stud—not seen) for a bar of extra length, when load considerations mandate.

Figure 5:
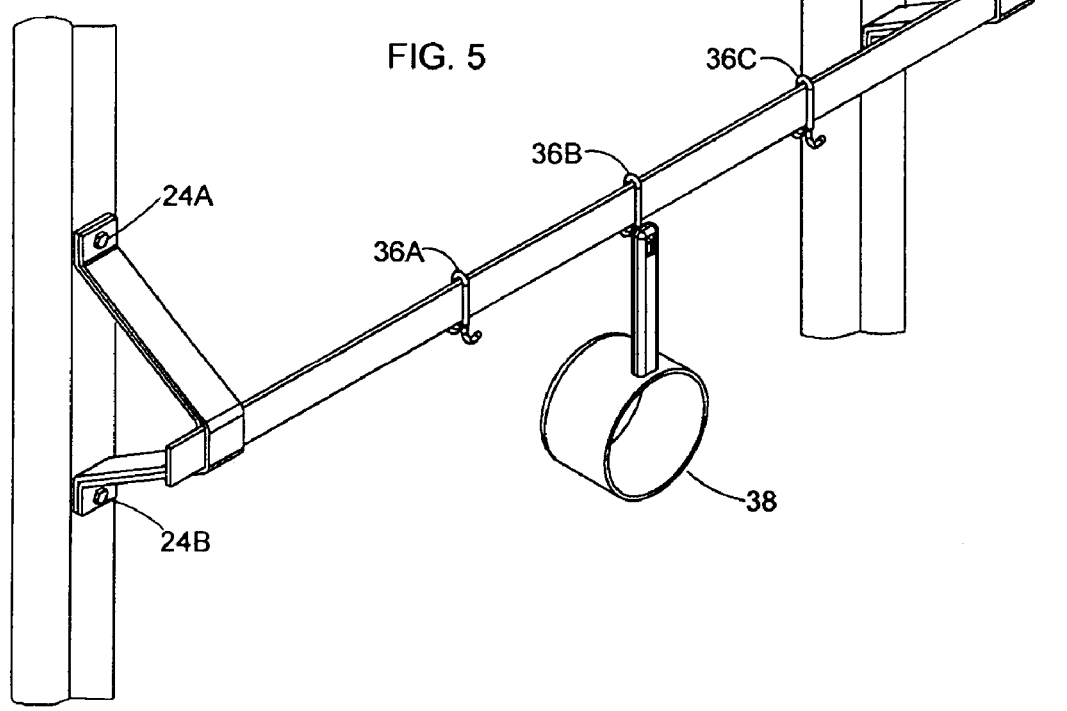
FIG. 5 is another perspective view of the fully assembled, bar support assembly of FIG. 4, while employed to store a typical kitchen utensil, being just one of many utensils to be hung, at will on the elongate horizontal bar.

In the other perspective view of FIG. 5, the assembly of FIG. 4 has now been completed, and the device of the present invention is in practical use. Typically, a plurality of moveable hang hooks, like 36A/B/C. are placed sporadically along horizontal bar 12, and they are used, as needed, to support kitchen utensils being used intermittently, such as depicted kitchen pan 38.

To achieve the functional orientation of the noted components, note the following:

The intermediate planar segment 38I of outer clamping component 16 0 must be measurably longer than the offset intermediate planar segment 38 0 of inner component 16I, so as to assure not only flush contact between the flanged outer end segments 20A/B and 20C/D, respectively. This also serves to provide complemental space differentials between the common plane of the flanged feet and that plane of its truncated apex, on the one hand, and the same two planes of the outer clamping component. As a rule of thumb, these offset planes will have a lateral differential that is a first measurement for the inner member. This is added the wall thickness of the clamp itself. The augmented lateral planes differential is the first measure plus wall thickness, which becomes the larger for the offset larger dimension for the offset planes for the outer member, on the other hand. This differential configuration results in the flush contact of the abutting flanged ends (22A–D), concurrent with presenting the useful, rectangular cross section slot 30 as defined by their opposing truncated apexes of the saddled clamping members (FIG. 3).

A major object achieved by the present invention is the erection of a utensil storage rack mounted on a sidewall, adapted to variable support stud spacing, whether 16 or 20 inches apart. Also, the saddled clamps provide such a grip on the horizontal bar component that precludes the need to drill added perforations to retain the bar in its desired lateral location. This is achieved with the complemental set of clamps, mated to form the gripping means, by virtue of the internal bevel formed at the opposing inner seams of the central planar segment. No added fasteners beyond those for stud mounting are then required.

The invention claimed is:

1. A hang bar assembly for interruptible suspension of one or more utensils, having a hang bar for securely mounting said utensils at a position offset from a building sidewall comprising:
   (a) a horizontally aligned, rigid bar having a shaft of variable length configured to be offset laterally from a building sidewall when in use, said rigid bar having opposing longitudinal ends;
   (b) at least two pairs of bracketing sets, each set being disposed proximal to one of the opposing longitudinal ends of the rigid bar;
   (c) each bracketing set comprising a first and second bracketing element;
   (d) means provided at the longitudinal ends of each element of the bracketing sets to secure said element to an adjacent sidewall while concurrently supporting the rigid bar in a functional position;
   (i) the first bracketing elements each having a generally V-shaped configuration with a planar apex when viewed in vertical cross section, and being of a first horizontal central depth,
   (ii) the second bracketing elements each having a substantially identical, V-shaped configuration, said second bracketing elements also having a planar apex when viewed in vertical cross section, and being of a second horizontal central depth, said second depth being greater than that of the first depth of the first bracketing elements, such that when a second element overlaps a first element, they form a passageway between their planar apexes, which is sized to receive the shaft of the rigid bar, and to firmly support one of the longitudinal ends of said bar; and, (iii) the second bracketing set being identically configured to the first bracketing set and being sized and located to receive and support the opposing longitudinal ends of the rigid bar, thereby presenting a means for supporting utensils in an area of frequent usage.

2. The assembly of claim 1 in which each of the first and second bracketing elements in the two or more bracketing sets has outwardly flanged, longitudinal ends, which are configured to contact flushly with a building sidewall.

3. The assembly of claim 1 in which three bracketing sets form the horizontal bar support means with two of the sets located proximal to the longitudinal ends of the bar, and the third set located intermediate of the longitudinal ends of the bar.

4. The assembly of claim 2 in which each of the flanged longitudinal ends of the bracketing elements have at least one transverse bore hole sized to receive a fastening means for affixing the flanged end to a sidewall.

5. The assembly of claim 1 in which the rigid bars is fabricated from a stainless steel sheet plate.

6. The assembly of claim 1 in which the rigid bar has a substantially rectangular cross section adapted to slidingly engage the passageway formed by each of the overlapped sets of bracketing means.

7. The assembly of claim 1 in which the bar support passageways are of variable vertical cross sections.

8. The assembly of claim 1 in which the bar support passageways have substantially rectangular transverse cross sections.

\* \* \* \* \*